UNITED STATES PATENT OFFICE.

JOHANNES KÖRNER, OF MANNHEIM, GERMANY.

MANUFACTURE OF PLATES FOR ELECTRIC ACCUMULATORS.

SPECIFICATION forming part of Letters Patent No. 571,598, dated November 17, 1896.

Application filed January 6, 1896. Serial No. 574,519. (No model.) Patented in Germany February 27, 1895, No. 84,186; in France June 8, 1895, No. 248,030; in Switzerland June 15, 1895, No. 10,462, and in Belgium October 21, 1895, No. 117,973.

*To all whom it may concern:*

Be it known that I, JOHANNES KÖRNER, residing at Lit. Q. VII, No. 9, Mannheim, Germany, have invented Improvements in the Manufacture of Plates for Electric Accumulators or Secondary Batteries, (for which Letters Patent have been obtained in Belgium, No. 117,973, dated October 21, 1895; in France, No. 248,030, dated June 8, 1895; in Switzerland, No. 10,462, dated June 15, 1895, and in Germany, No. 84,186, dated February 27, 1895,) of which the following is a specification.

The many improvements in secondary batteries hitherto effected related either to special forms of the grids, latticed plates, or supports for the paste, or to the composition of the latter, or to the devices for constructing the finished electrodes; but hitherto no efforts have been made to protect from the destructive action of the electrolyte the grids, latticed plates, or supports, and conductors of the electric current, in order to impart to the accumulator an almost unlimited duration of life, as the duration of life of the accumulator depends on the maintenance of these grids or supports in their original condition.

This invention consists in covering the above-mentioned supports for the paste or active material and the conductors in electric accumulators of all kinds with a protective coating against the destructive action of the electrolyte, such coating consisting of fine crystals of sulfate of potash, (neutral or acid sulfate of potash, or both,) whereby the duration of life of the accumulator is considerably prolonged.

The conductors for the electric current, in the form of grids, boxes, or frames, or various sections, or as plates with even or uneven surfaces, serve also as supports for the paste or active material. Before these conductors are coated with the paste which accumulates the current it is important that they be protected in some suitable manner against the electrolyte, in order that the duration of life of the accumulator may not be very considerably shortened by their destruction. For this purpose I employ a deposit of crystals of normal sulfate of potash and acid sulfate of potash.

The grids or supports are inserted in a vessel in alternating succession of negative and positive plates in the usual manner and are metallically connected. In this vessel sulfuric acid is poured, to which sulfate of potash is then added, and an electric current is discharged into it until the liquid becomes warm. With the increasing heat of the electrolyte its property for dissolving the sulfate of potash also increases and continues as long as the solution is not fully saturated. A portion of the sulfate of potash is converted by this heating into acid sulfate of potash, which is deposited in the form of rhombic pyramids on the conductors. As the surface of the conductors becomes pitted under the electrolytic action of the current the aforesaid crystals adhere more firmly, and then to a certain extent an "amalgamation" (as it may be called) of the crystals with the conductor which is pitted on its surface takes place. After the layer of crystals has set and becomes sufficiently thick the grids, latticed plates, or supports are ready for coating with the paste or active material. The finished electrodes are then, during the period of formation, immersed in a bath of the same composition and charged with current in such a way that the bath again becomes heated, and thereby as much sulfate of potash as possible is brought into a soluble condition. Here again, as a consequence of the electrolytic action of the current, each particle of the paste is also inclosed with a crystalline coating. This coating with crystals of sulfate of potash produces, in addition to a considerable diminution of the internal resistance of the battery, a thorough contact of the paste with a conductor, and the hardness of the crystals renders it more difficult for the active substance to fall off. It is therefore necessary for the practical use of the accumulator that sulfate of potash be always present in excess in the electrolyte.

I claim as my invention—

1. As an improvement in the manufacture of secondary-battery plates, causing a protective layer of sulfate of potash to be deposited thereon and then applying the active material or paste, substantially as described.

2. The improvement in the manufacture of plates for electric accumulators or secondary batteries, consisting in exposing the uncoated carrying frames, plates or grids to the action of the electric current in a solution of sulfate of potash and sulfuric acid in order to deposit a crystalline coating thereon, for the purpose of protecting them from the destructive action of the electrolyte, substantially as set forth.

3. Plates for electric accumulators or secondary batteries consisting of grids or other carriers or conductors coated directly with a protective layer composed essentially of acid sulfate of potash, substantially as described.

In testimony whereof I have signed my name to this specification in the presence of two subscribing witnesses.

JOHANNES KÖRNER.

Witnesses:
SEBASTIAN UHLMAN,
H. C. MORANO.